United States Patent [19]

Griffith et al.

[11] 3,953,013
[45] Apr. 27, 1976

[54] METHOD AND APPARATUS FOR CLAMPING A WORKPIECE IN A QUASI-LIQUID MEDIUM

[75] Inventors: John E. Griffith, Mahopac; David D. Grossman, Yorktown Heights, both of N.Y.; Peter M. Will, Norwalk, Conn.

[73] Assignee: International Business Machines Corporation, Armonk, N.Y.

[22] Filed: Dec. 31, 1974

[21] Appl. No.: 537,805

[52] U.S. Cl. .................................. 269/7; 29/559; 51/235; 269/21
[51] Int. Cl.² .................... B25B 11/00; B23Q 3/00
[58] Field of Search .............. 269/7, 8, 20, 21, 266; 51/235; 279/3; 29/559

[56] References Cited
UNITED STATES PATENTS

| 3,025,208 | 3/1962 | Geiger | 269/21 |
|---|---|---|---|
| 3,589,704 | 6/1971 | Kurtz | 269/7 |
| 3,660,949 | 5/1972 | Coes | 269/7 X |
| 3,729,206 | 4/1973 | Cachon | 269/21 X |

*Primary Examiner*—Al Lawrence Smith
*Assistant Examiner*—Nicholas P. Godici
*Attorney, Agent, or Firm*—Roy R. Schlemmer, Jr.

[57] ABSTRACT

A quasi-liquid vise is provided for clamping irregularly shaped workpieces which comprises an open-topped vessel into which a workpiece may be inserted, a particulate fluidizable material located within and, substantially filling said vessel, pressure means connected to said vessel for introducing a gas or fluid therein to fluidize said particulate material, and means for applying a vacuum to said vessel and the particulate material to substantially solidify said particulate material when it is desired to clamp a workpiece therein. The solidifying effect of said vacuum applied to said particulate material may be enhanced by utilizing alternate layers of different sized particulate material wherein smaller particles fill voids and enhance the vacuum effect and hence the rigidity of the particulate material when it is desired to solidify same. Two additional approaches to improving the vacuum solidification effect include coating relatively dense particles with a somewhat resilient deformable material whereby better sealing action will be effected. Also, uniquely shaped particles may be utilized wherein a more rigid interlocking particle effect will be obtained upon application of the vacuum.

4 Claims, 10 Drawing Figures

METHOD AND APPARATUS FOR CLAMPING A WORKPIECE IN A QUASI-LIQUID MEDIUM

BACKGROUND OF THE INVENTION

1. Field of the Invention

There are many industrial applications in which it is necessary to hold irregularly shaped parts in a relatively precise position in order to allow further machining operations to be done upon the workpiece or for the purpose of supporting it during some further assembly type of operation. Such a holding unit is commonly referred to as a jig, fixture device or a clamp.

A common workbench vise consists of two parallel jaws which can be caused to squeeze a mechanical part, thus holding it rigidly. Such a device has certain limitations. It cannot readily grip parts of arbitrary shape and unless the entire vise is rotated, it cannot grip parts at arbitrary angles.

For some applications, it is desirable that these limitations be overcome. In particular, for the application of mechanical assembly methods by means of an industrial robot or manipulator, it is highly desirable that the robot's work area be provided with a highly versatile vise because such a vise would eliminate the need for otherwise having a large number of highly specialized vises and other holding fixtures. The herein disclosed vise is particularly well adapted for use with a mechanical robot; however, the concept involved can also be utilized in other applications and need not be restricted to automated assembly processes.

2. Prior Art

There have been a number of prior art devices which were developed for the purpose of holding irregularly shaped objects for such purposes as machining operations. These have included means for mounting a specimen in a thermoplastic material as exemplified by U.S. Pat. No. 3,319,289 of J. B. McCormick entitled "Apparatus For Mounting A Specimen", which issued May 16, 1967. U.S. Pat. No. 3,574,257 of DuBois et al, entitled "Automatic Cutting of a Substrate Coated with Thin Layers", issued Apr. 13, 1971, discloses freezing a substrate for the purpose of holding same for subsequent machining operations.

U.S. Pat. No. 3,197,682 of D. L. Klass et al, entitled "Safe Electro-Responsive-Fluid Chuck", issued July 27, 1965, utilizes the Winslow effect wherein the part to be clamped is immersed in a fluid which is subject to an intense alternating electric field to thus increase viscosity of the fluid holding the workpiece. Simple electromagnets have also been utilized to hold irregularly shaped necessarily ferromagnetic workpieces.

U.S. Pat. No. 3,660,949 of Coes, Jr. entitled "Work Holder for Irregular Shaped Workpieces", issued May 9, 1972, discloses a magnetic clutch type of holding apparatus wherein ferromagnetic pellets are fluidized with air pressure and a workpiece inserted therein. Then, the air pressure is turned off and a strong electromagnetic field is applied which rigidizes or solidifies the ferromagnetic pellets thus clamping the workpiece for desired operations.

The above-disclosed devices suffer from a number of problems such as either being quite slow to set up, they undesirably wet or contaminate the workpiece or, in the case of the magnetic system, usually leave some degree of remanent magnetization where ferromagnetic materials are included in the workpiece thus possibly interfering with subsequent use of the part.

SUMMARY AND OBJECTS OF THE INVENTION

It has been found that a very effective vise, jig on fixture can be obtained utilizing a particulate material in an open container the bottom of which is provided with means for selectively introducing a gas stream or vacuum source thereto. By selecting the material and gas pressure, the vise can be selectively fluidized and subsequently caused to shift from the fluid or liquid phase back into a solid phase by the application of a vacuum to the device. The device may be rapidly switched from the fluid or open phase to the solid or clamping phase quite rapidly with fewer adverse effects than with currently available devices of this sort as set forth above.

It is accordingly the primary object of the present invention to provide a quasi-liquid device for clamping irregularly shaped objects.

It is a further object to provide such a vise capable of clamping differently shaped object with no modification to the device.

It is yet another object to provide such a vise capable of energization solely by gas pressure and vacuum.

It is another object of the invention to provide such a vise which avoids the possibility of "wetting" the work piece or remanently magnetizing same.

It is a still further object of the invention to provide such a vise wherein the rigidity thereof may be enhanced by carefully choosing the shape and size of the particulate material therein.

Other objects, features and advantages of the invention will be apparent from the following description of the disclosed embodiments.

DRAWINGS

FIG. 1 comprises a cross-sectional view of a quasi-liquid vise constructed in accordance with the teachings of the present invention.

FIGS. 2A through 2F illustrate different (greatly enlarged configurations of the particulate material which can be utilized in the quasi-liquid vise in FIG. 1 for the purpose of enhancing rigidity.

FIGS. 3A and B are cross-sections of a quasi-liquid vise similar to FIG. 1 illustrating the vise in a fluidized and rigid condition utilizing layers of different sized particles to enhance the vacuum characteristics.

FIG. 4 is a functional schematic representation of a multi-stage or matrix quasi-liquid vise constructed in accordance with the present invention wherein individual elements of the vise may be selectively energized or de-energized in some predetermined fashion such as by computer control.

DESCRIPTION OF THE PREFERRED EMBODIMENT

Figure 1:
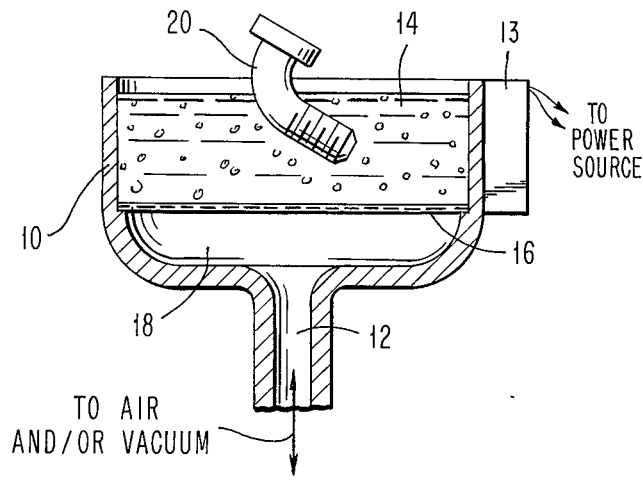

The objects of the present invention are accomplished in general by a quasi-liquid vise comprising an open topped vessel into which an irregularly shaped workpiece may be inserted. The vessel contains a particulate fluidizable material therein to a depth sufficient to surround said workpiece to a predetermined distance. Means are located at the bottom of said vessel for introducing a gas under pressure capable of fluidizing said particulate material due to upward gas flow in said vessel which tends to lift or float said particulate material. Further means are provided for applying a vacuum to said vessel and removing said pressurized fluid supply whereby the particulate material settles about said workpiece and due to the downward force on said particulate material caused by reverse gasflow causes said particulate material to substantially solidify thus grasping the workpiece therein.

The degree of solidification and thus the clamping effect may be enhanced by coating the particles with a deformable material or by selecting shapes so that they, in essence, interlock. Also a plurality of different sized particles may be utilized such that the smaller particles tend to fill in voids between the larger particles when the vacuum is applied to the vise.

The quasi-liquid vise constructed in accordance with the teachings of the invention has a number of advantages not possible with similar types of vises wherein the particular material used forms an intrinsic part of the clamping phenomenon such as with low melting point solids or magnetic vises. The vise of the presnt invention may be cycled an unlimited number of times without any appreciable deterioration of either the clamping effect or of the material per se. Further, due to the wide variety of materials which may be used, there is no problem with the vise material wetting or in any way adhering to the workpiece as might be the case with either of the above two enumerated, prior art clamping systems. Further, with the present vise, there is no problem with the clamping agent in any way corroding the workpiece. The clamping or rigidifying step does not cause the material to expand and thus possibly cause considerable movement of the workpiece but rather shrinks slightly when the vacuum is applied. Finally, the vise acts quite rapidly, from the fluidized to the solid state.

These properties are inherent in the present vise because the actual clamping material is a quasi-liquid rather than a true liquid and is also due to the fact that the application of the vacuum does not cause any appreciable change in the physical state of the individual particles making up the particulate clamping material as is the case with the true liquid solid vises and the magnetic vise.

The quasi-liquid vise of the present invention has certain inherent limitations insofar as preciseness of positioning and also the degree of rigidity which can be transmitted to the workpiece which somewhat limit its use for precise machining operations. However, the device is extremely useful for holding a workpiece for assembly operations such as would be encountered in a highly automated assembly line where many of the assembly operations are automated and/or robotized.

In particular, the device is extremely useful for the operation of turning the workpiece and regrasping it in a different orientation. For an irregularly shaped workpiece, regrasping is normally a difficult procedure because the workpiece cannot be put down in an arbitrary position without falling over. Thus, either a second robot arm or a special purpose fixture is normally required for this operation.

In one embodiment of the invention shown in FIG. 4, a matrix type of clamp is disclosed and will be described in more detail subsequently wherein a plurality of individual quasi-liquid vises are in essence contained in a single bed or tray which could be utilized to hold a number of different parts during an assembly type of operation, wherein individual members of the matrix may be selectively actuated either separately or in unison depending upon the particular operation desired.

Before proceeding with the description of the invention, the term quasi-liquid should be defined. The term is intended to refer to the particulate material utilized in the vise or more particularly within the open container which material may or may not be coated with some surfacing material. The particles are chosen to be of such a size, shape and weight that when taken with a given gas flow, they may be caused to partially float in the air stream. At this point, the material is said to be fluidized, i.e., the particles begin to lift slightly and move about in the container, colliding with one another and generally behaving in a manner analogous to the behavior of molecules in a liquid. As such, this technique is known in the art as a fluidized bed. Thus, the particulate material when placed in the environment of the present vise behaves very much like a fluid when the bed is fluidized or when a gas pressure source is connected to the container holding the particulate material.

When a mechanical part is partially immersed in such a fluidized bed, there will be a buoyant force on it tending to push it out. This buoyancy depends on the density of the particulate material and can be adjusted to approximate the weight of the part to be held by either adjusting the gas pressure or even the size of the particulate material. By appropriate adjustment, a minimal force is required to push the part to be held into the quasi-liquid vise. When the part has been immersed to the desired depth in the quasi-liquid and it is desired to now hold the part rigidly, the gas pressure may be turned off and a vacuum applied. The result of this is that the particulate material now settles down in the chamber and compacts due both to its own weight and also to a reverse gas flow passing down through the particulate material into the vacuum line. Thus, the material is in effect rigidized. The degree of rigidity will of course depend on a number of factors, such as the degree of the vacuum, the shape of the particulate material, etc., as will be apparent from the following more particular description of the device.

Referring to FIG. 1, there is shown a somewhat simplified cross-sectional view of a preferred embodiment of the invention. The vise container or body member 10 is shown having an open side facing upwards and having an air and vacuum inlet opening 12 in the bottom thereof to which either air pressure or a vacuum may selectively be applied. A particulate material 14 is shown within the container 10, said particulate material being supported on a perforated plate member 16 which could either be comprised of sintered material or simply be a solid plate having many small holes drilled therein. Just below the plate there is shown a plenum chamber 18 into which air pressure or vacuum may be introduced via the opening 12 in the bottom of the chamber.

The base, or plate member 16 which supports the balls is as stated previously, preferably made of a porous filter material. The filter holes should be as large as possible to permit free air flow, but they must be sufficiently small that the balls can not enter. Strength is required to support the weight of the balls and the force of air pressure, particularly when the compacting vacuum is turned on. A suitable filter can be constructed by placing a thin sheet of the filter material upon a thick sheet of coarse filter material. Porous plastics perform well and are commercially available. Screens are also suitable.

A workpiece 20 is shown located in the particulate material 14 and, as is evident from the shape, such a workpiece would be somewhat difficult to hold in a conventional vise. As will be apparent, there is no limitation on the shape which consecutive workpieces could have and still be held in such a vise whereas with a more conventional type vise utilizing shaped jaws, jaws of a certain configuration would only be suitable for holding workpieces of a matching configuration.

Proceeding now to the detailed views of FIGS. 2A through 2F, there are shown means particularly suited to improving the holding characteristics of the quasi-liquid vise. First, referring to FIG. 2A, there is shown a metallic ball, such as iron or steel 22 covered with, for example, a teflon or rubber coating 24. The coating serves a number of functions among which are to form a resilient shield so as to avoid marring the workpiece and also causes the individual particles to pack together somewhat more tightly due to the slight deformability of the resilient coating. The coating also tends to prevent the particulate material from adhering to the workpiece.

Figure 2A:
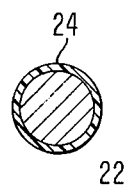

The diameter of the individual particles of the type illustrated in FIG. 2A could vary anywhere between 0.005 inches and 0.02 inches. However, in the case of small iron balls, a size of 0.01 inches was found to be quite satisfactory in that it had good holding characteristics and could be readily fluidized with reasonable gas pressure.

Figure 2B:
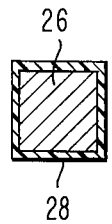

The embodiment of FIG. 2B shows individual particles shaped like small cubes 26 suitably covered with a resilient coating 28. The reason for utilization of the cubes would be to increase the rigidity of the particulate material when the pressure is removed and the vacuum is applied since the material so shaped would tend to lock together in a quasi crystalline structure.

Figure 2C:
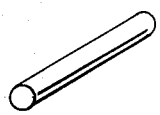
Figure 2D:
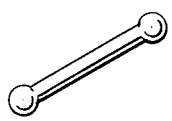
Figure 2E:
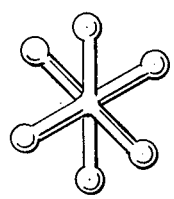

FIGS. 2C, 2D and 2E respectively show cylindrical particles, 'dumbbell' shaped particles and 'jac,' shaped particle, respectively. These shapes may or may not be covered with some resilient coating as desired. In each case, the particular shapes would tend to alter the rigidity of the particulate bed when in the locked or vacuum state. It should be recognized, however, that with these shapes and particularly the jack-shaped particles, they would tend to lock together and subsequent fluidization could be somewhat of a problem. This may be overcome however by applying an external vibration to the mass of particulate material, such as by a sonic transducer 13 shown diagramatically in FIG. 1 or some other mechanical vibrating means.

Figure 2F:
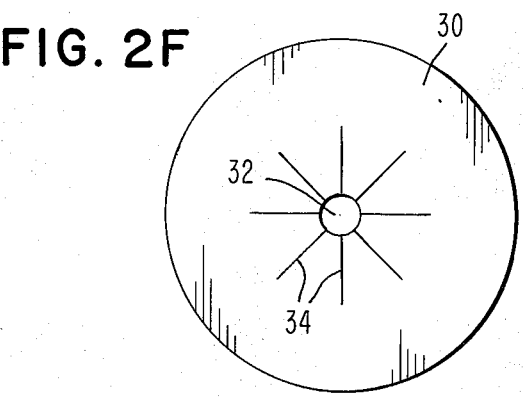

FIG. 2F shows a thin mylar membrane which may be conveniently placed over the top of the container 10 once it has been filled with the particulate material. The film 30 has a hole 32 in the center thereof through which the workpiece is inserted. The provision of a number of radial slits 34 permits workpieces of differing shapes to be inserted into the vise without having to utilize a custom made membrane each time. The function of the membrane is to increase the vacuum effect by sealing the particulate bed to thus further rigidify the vise and the strength of the clamping action. It will be readily appreciated that in an operating embodiment some sort of a clamping means would in all probability have to be utilized around the periphery of the container 10 to retain the membrane 30 on the top of the vise during the fluidizing or unlocked condition.

Figure 3A:
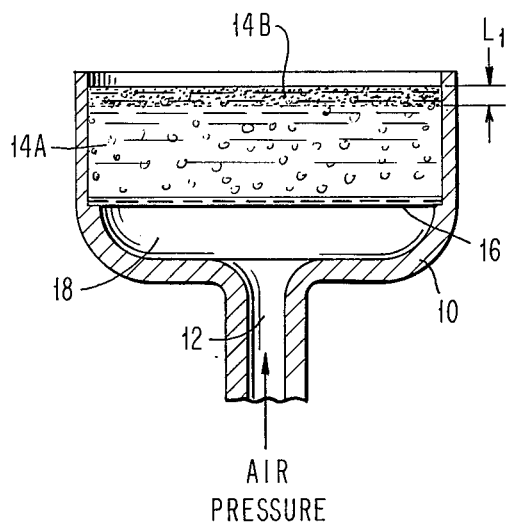
Figure 3B:
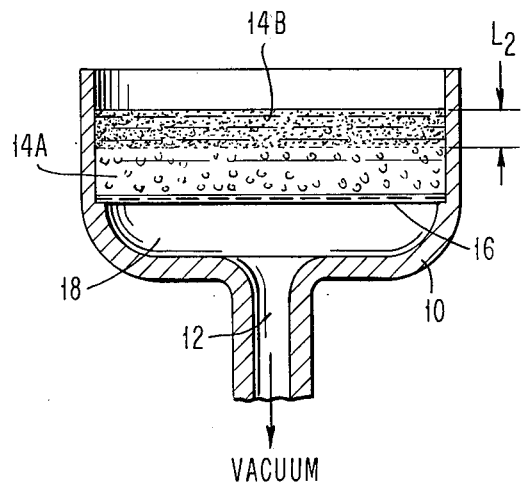

FIGS. 3A and 3B illustrate an additional method of increasing the vacuum effect in the quasi-liquid vise of the present invention. It will be noted that the vise structure in FIGS. 3A and 3B is substantially identical to that of FIG. 1 wherein the same reference numerals are utilized to illustrate similar portions of the vise assembly. It will be noted that the difference lies in the fact that there are two distinct layers of particulate material shown in FIG. 3A which are designated as 14A and 14B. The particulate material of portion 14A is the primary particulate material utilized to hold a workpiece whereas the layer 14B contains a considerably smaller sized material of suitable density which will in essence fill the voids between the larger particles when the vacuum is applied. The two distinct layers are formed in FIG. 3A when the bed is fluidized since the smaller particles tend to rise in the fluidized bed and literally float on top of the larger particles of 14A. It will be noted that the thickness of the bed 14B is designated as $L_1$. Referring now to FIG. 3B wherein a vacuum is applied, the overall top surface within the liquid vise will be noted to have dropped considerably. This is due to the fact that the vacuum has been applied and the particulate material is now much more densely packed within the vise. Further it will be noted that the layer 14B designated as having a thickness $L_2$ has apparently increased in thickness. This is for the purpose of indicating that the smaller particles have now migrated somewhat into the upper portion of the larger particulate material layer 14A so that in actuality the upper layer is composed of both larger and smaller particles filling up the interstices between the said larger particles. Thus, the concept of utilizing two different size particle layers within the vise is essentially for the same purpose as the flexible membrane of FIG. 2F, i.e., to in effect seal the upper area of the vise to enhance the vacuum and holding power of same. A typical ratio of sizes between the smaller balls of layer 14B to those of 14A might be one-fourth of the diameter of the larger balls.

Figure 4:
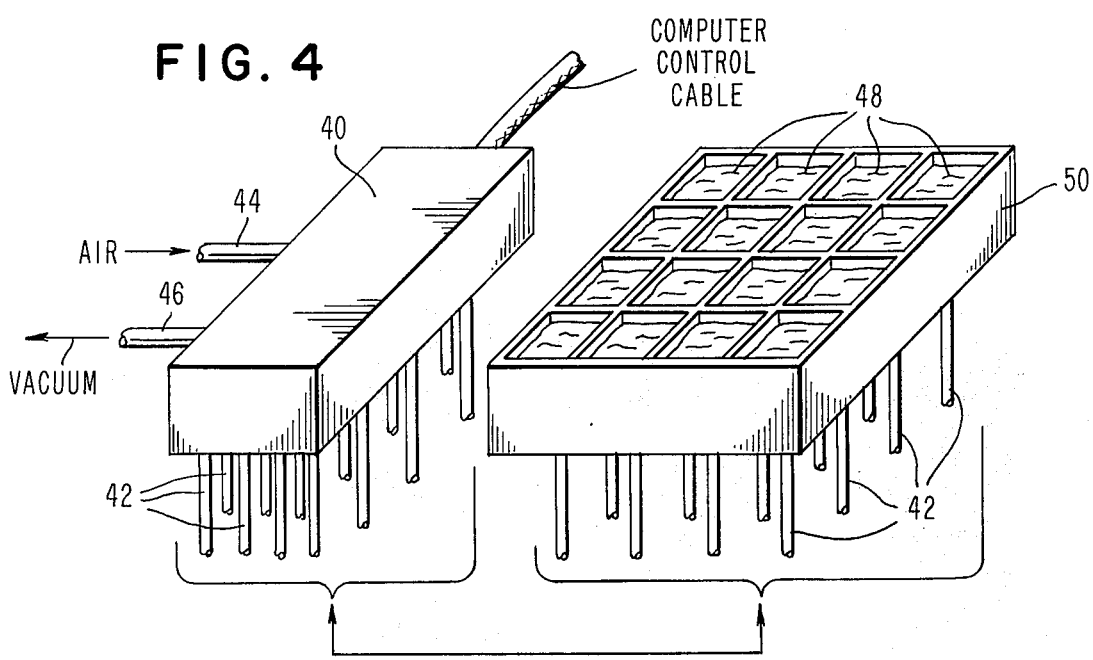

FIG. 4 illustrates functionally a quasi-liquid vise matrix constructed in accordance with the principles of the present invention. This configuration has special utility in automated assembly lines where a computer controlled electro-mechanical robot, for example, might manipulate parts and wish to place a plurality of identical parts in the quasi-liquid vise or place different parts, for a particular assembly operation, in contiguous locations in the quasi-liquid vise matrix. The assembly is shown in essentially block diagram form in FIG. 4. Box 40 comprises an address decoding and air valve controlling means which is actuated from the computer control line. In accordance with particular electrical address signals received from the computer a particular one (or more) of the outlet lines 42 may be connected selectively to the air or vacuum lines 44 and 46. As will be apparent, there is a line 42 for each of the quasi-liquid vises 48 making up the vise matrix 50. Thus, individual elements 48 making up the overall matrix may be selectively fluidized or locked depending upon the signals received in the individual selection unit 40. The individual devices 48 may readily be constructed in the same way as the individual vises shown in FIG. 1.

It may readily be seen that the matrix configuration of the quasi-liquid vise shown in FIG. 4 would readily lend itself to automated or partially automated assembly lines wherein robotized part handling could be coupled with the computer controlled vise assembly to, for example, assemble and locate in some optimal fashion all of the parts for some sub-assembly operation.

The above description of the use of the matrix arrangement of FIG. 4 in an automated or partially automated assembly line is of course only suggestive as such a quasi-liquid vise matrix made up of individually actuable elements might have use in any number of different applications. It might also be desired to actuate two or more of the individual units concurrently rather than individually as described previously.

The preceding description of the herein disclosed embodiments of the invention is intended as a generalized teaching, as many different modifications of the device structure as well as the individual device materials could be developed for a particular application utilizing the basic concept of first fluidizing a particulate bed, inserting the workpiece, and then connecting the vise to a vacuum to de-fluidize the bed and rigidly lock the particulate mass together to provide a rigid support for a workpiece. In summation, many other quasi-liquid vise configurations, particular materials, and the shape of the particulate material may be devised by those skilled in the art without departing from the general spirit and scope of the present invention as set forth in the following claims.

What is claimed is:

1. A quasi-liquid vise comprising an open topped vessel adapted for receiving a workpiece, a particulate fluidizable material located within said vessel wherein the individual particles are each coated with a resilient material and wherein said resilient material is slightly adherent to itself and including pressure means selectively connectable to said vessel for introducing a gas stream therein to fluidize said particulate material, means for imparting physical vibration to said vessel to overcome the adherence of said coating material during fluidization of said vise, and means for selectively applying a vacuum to said vessel whereby the particulate material is de-fluidized and is caused to substantially solidify whereby any workpiece inserted in the vessel during the fluidizing step will be rigidly clamped.

2. A quasi-liquid vise comprising an open topped vessel adapted for receiving a workpiece, a particulate fluidizable material located within said vessel, pressure means selectively connectable to said vessel for introducing a gas stream therein to fluidize said particulate material, and means for selectively applying a vacuum to said vessel whereby the particulate material is de-fluidized and is caused to substantially solidify whereby any workpiece inserted in the vessel during the fluidizing step will be rigidly clamped.

said particulate material being made up of individual particles of at least two different sizes whereby upon fluidizing the different sized particles form distinct layers in the quasi-liquid vise and upon application of the vacuum the smaller particles tend to full the voids between the larger particles, thus increasing the vacuum and the solidification effect of said vise.

3. A method for clamping a workpiece in a desired position comprising the steps of inserting said workpiece in an open topped vessel containing a particulate fluidizable material located therein, and including the step of fluidizing said particulate material by causing a low pressure gas stream to flow upwardly through said particulate material to fluidize same, adjusting said workpiece to a desired location, and applying a vacuum to said vessel whereby said particulate material is de-fluidized and caused to substantially solidify clamping said workpiece in the desired position.

4. A method for clamping a workpiece as set forth in claim 3 including the steps of enhancing said solidification of said particulate material by causing said particulate material to lock together in a quasi-crystalline mass under the influence of said vacuum.

* * * * *